US010288725B2

(12) United States Patent
Tan et al.

(10) Patent No.: US 10,288,725 B2
(45) Date of Patent: May 14, 2019

(54) APPARATUS AND METHOD FOR PERFORMING PASSIVE SENSING

(71) Applicant: UCL Business PLC, London (GB)

(72) Inventors: Bo Tan, London (GB); Karl Woodbridge, London (GB); Kevin Chetty, London (GB)

(73) Assignee: UCL Business PLC, London (GB)

( * ) Notice: Subject to any disclaimer, the term of this patent is extended or adjusted under 35 U.S.C. 154(b) by 413 days.

(21) Appl. No.: 15/032,592

(22) PCT Filed: Oct. 30, 2014

(86) PCT No.: PCT/GB2014/053226
§ 371 (c)(1),
(2) Date: Apr. 27, 2016

(87) PCT Pub. No.: WO2015/063488
PCT Pub. Date: May 7, 2015

(65) Prior Publication Data
US 2016/0259041 A1 Sep. 8, 2016

(30) Foreign Application Priority Data
Oct. 30, 2013 (GB) .................................. 1319151.5

(51) Int. Cl.
G01S 7/41 (2006.01)
G01S 13/00 (2006.01)
(Continued)

(52) U.S. Cl.
CPC ............. *G01S 13/003* (2013.01); *G01S 7/418* (2013.01); *G01S 7/42* (2013.01); *G01S 13/0218* (2013.01); *G01S 13/58* (2013.01)

(58) Field of Classification Search
CPC ...... G01S 1/20; G01S 13/003; G01S 13/0218; G01S 2013/0227; G01S 7/4021;
(Continued)

(56) References Cited

U.S. PATENT DOCUMENTS 5,252,980 A * 10/1993 Gray ..................... G01S 13/003
342/107
6,133,876 A * 10/2000 Fullerton ................ G01S 13/42
342/132
(Continued)

FOREIGN PATENT DOCUMENTS

EP 1992963 A2 11/2008
WO 02/091018 A1 11/2002
(Continued)

OTHER PUBLICATIONS

P.E. Howland et al., "FM Radio Based Bistatic Radar" IEE Proceedings; Radar Sonar & Navigation; Institution of Electrical Engineers, GB, vol. 152, No. 3, Jun. 3, 2005 (Jun. 3, 2005); pp. 107-115, XP006024052; ISSN: 1350-2395.
(Continued)

Primary Examiner — Peter M Bythrow
(74) Attorney, Agent, or Firm — Park, Vaughan, Fleming & Dowler LLP

(57) ABSTRACT

A method and an apparatus are provided for performing passing sensing using wireless digital communications. The wireless digital communications are frame-based with a predefined frame structure. The method includes receiving a reference signal into to a reference channel, wherein the reference signal comprises a direct version of a radio frequency transmission as part of said wireless digital communications; receiving a surveillance signal into a surveillance channel; detecting and extracting portions of the reference signal corresponding to data transmissions based on said predefined frame structure; extracting portions of the sur-
(Continued)

veillance signal corresponding to the extracted portions of the reference signal; performing a cross-correlation on the extracted portions of the reference signal and the surveillance signal to determine a range-Doppler surface; and providing a real-time display of said range-Doppler surface and/or of information derived therefrom.

11 Claims, 8 Drawing Sheets

(51) Int. Cl.
    *G01S 13/02*     (2006.01)
    *G01S 13/58*     (2006.01)
    *G01S 7/42*     (2006.01)

(58) Field of Classification Search
    CPC .......... G01S 7/418; G01S 13/42; G01S 13/58; G01S 13/872
    See application file for complete search history.

(56) References Cited

U.S. PATENT DOCUMENTS

| | | | | |
|---|---|---|---|---|
| 6,417,796 | B1 | 7/2002 | Bowlds | |
| 7,155,240 | B2* | 12/2006 | Atkinson | G01S 13/003 455/456.2 |
| 7,277,052 | B2* | 10/2007 | Delaveau | G01S 7/352 342/387 |
| 7,619,554 | B2* | 11/2009 | Shklarsky | G01S 13/003 342/180 |
| 7,782,256 | B2* | 8/2010 | Smith | G01S 5/06 342/453 |
| 8,203,486 | B1* | 6/2012 | Smith | G01S 5/06 342/452 |
| 2002/0167440 | A1* | 11/2002 | Baugh | G01S 7/023 342/159 |
| 2003/0020653 | A1* | 1/2003 | Baugh | G01S 7/285 342/451 |
| 2004/0257270 | A1* | 12/2004 | Poullin | G01S 7/414 342/159 |
| 2008/0088508 | A1* | 4/2008 | Smith | G01S 5/06 342/453 |
| 2010/0085243 | A1* | 4/2010 | De Gramont | G01S 7/352 342/175 |
| 2011/0274220 | A1* | 11/2011 | Andgart | G01S 5/0221 375/342 |
| 2012/0098697 | A1* | 4/2012 | Paek | G01S 13/003 342/174 |

FOREIGN PATENT DOCUMENTS

| | | |
|---|---|---|
| WO | 2005/052630 A2 | 6/2005 |
| WO | 2009/128002 A1 | 10/2009 |
| WO | 2010/051859 A1 | 5/2010 |

OTHER PUBLICATIONS

International Search Report in corresponding International Application No. PCT/GB2014/053226 dated Jan. 19, 2015.
Search Report under Section 17(5) from UK Intellectual Property Office in corresponding UK Application No. GB1319151.5, dated May 23, 2014.

* cited by examiner

Time domain cross-correlation output of a 802.11 SYNC sequence and a recorded passive WiFi radar reference channel. The correlation peaks indicated by the arrows correspond to the start times of the PLCP protocol data units (PPDUs)

APPARATUS AND METHOD FOR PERFORMING PASSIVE SENSING

FIELD OF THE INVENTION

The present application relates to a method and apparatus for performing passive sensing, for example using a W-Fi signal.

BACKGROUND OF THE INVENTION

Radio transmissions have been utilised for detecting objects for many years, since the first radar (radio detecting and ranging) systems. Radar is an example of an active sensing system, in which a radio signal is specifically transmitted towards a target or area of interest, and reflected signals are then analysed to detect any target within the area of interest. Active sensing systems such as radar are very widely used in many applications, such as air traffic control, meteorological measurements, and so on.

Another form of radio sensing is passive sensing, in which there is no specific transmission of a radio signal towards a target. Rather, passive sensing relies on existing (background) radio signals that are generated and utilised for other purposes, and detects reflections from these other signals in order to investigate a target. Passive sensing is attractive in circumstances in which is not feasible or desirable to use a specific radio transmission for active sensing. For example, in a military context, an adversary may detect a specific radio transmission being used for active sensing. This detection may warn the adversary that surveillance is being performed, and it may also allow the adversary to track back to the installation that is responsible for the specific radio transmission. However, in passive sensing, the adversary is unable to determine that surveillance is being performed, since only the background radio transmissions (and their reflections) are present.

One known method of performing passive sensing involves synchronously recording two separate signal streams. One stream is called the reference channel and is a direct measurement of a background radio signal being transmitted from a particular location. The other stream is called the surveillance channel and receives multiple copies of the transmitted (background) signal after potentially multiple reflections via any targets of interest, clutter and multipath. The surveillance channel may also receive the transmission (background) signal directly from the particular location—i.e. through a direct transmission from the origin of the signal, without any reflections, etc. This receipt of the directly transmitted signal represents an unwanted and problematic component, and is often referred to as direct signal interference (DSI).

In a typical implementation, the reference and surveillance channels are down-converted to either baseband or intermediate frequencies and digitized to produce signals which are represented as two large size complex 1-D arrays. The size (N) of the 1-D array depends on integration time T (s) and sampling rate R (samples/s) and is given by N=T·R. The reference and surveillance channel arrays can therefore be represented by:

Reference Channel: $X=[x_1, x_2, \ldots, x_N]$
Surveillance Channel: $Y=[y_1, y_2, \ldots, y_N]$ where $x_i$ and $y_i$ are the complex array entries.

Processing of the surveillance signal involves searching for at least one time-delayed, Doppler-shifted copy of the reference signal. This is achieved by calculating the cross-ambiguity surface G(j,n) between the surveillance and reference signals measured by the system according to equation (1) below.

$$G(j,n) = \sum_{k=0}^{K-1} x_k y_{k+j} e^{-2\pi i \frac{nk}{K}} \quad (1)$$

The output from equation (1) is a 2-dimensional array commonly known as the cross-ambiguity surface. One dimension (n) in the array indicates the Doppler frequency shift of a signal reflection detected in the surveillance channel, which can be translated into a target velocity. The other dimension (j) represents the time-delay between the reference and surveillance channels and can be interpreted as a target range. The cross-ambiguity surface is therefore sometimes referred to as a range-Doppler surface.

Equation (1) is based on the ambiguity function, which is a two-dimensional function of time delay and Doppler frequency and is often used in radar to determine the distortion of a returned pulse due to the receiver matched filter (commonly, but not exclusively, used in pulse compression radar) due to the Doppler shift of the returned pulse from a moving target. The ambiguity function is determined by the properties of the pulse and the matched filter, rather than any particular target scenario. Many definitions of the ambiguity function exist (depending on the particular circumstances); for a given complex baseband pulse s(t), the narrowband ambiguity function is given by:

$$\chi(\tau,f) = \int_{-\infty}^{\infty} s(t)s^*(t-\tau)e^{i2\pi ft}dt \quad (1A)$$

where * denotes the complex conjugate. Note that for zero Doppler shift (f=0) this reduces to the autocorrelation of s(t). The result after completing the ambiguity function of Equation (1A) is called the (cross)-ambiguity surface, and the generation of this (cross)-ambiguity surface is often referred to as ambiguity processing. It will be appreciated that Equation (1) is a discrete version of Equation (1A) (for use with sampled data), with the reference signal corresponding to the pulse s(t), and the surveillance signal corresponding to the reflected version of this signal.

As an example, if the surveillance signal contains a component corresponding to the reference signal, but with a time delay Δt with respect to the reference signal itself, this indicates that the component has traveled an additional distance of cΔt with respect to the reference signal (where c is the propagation speed of the radio signal). Similarly, if the component of the surveillance signal has a frequency shift of Δf with respect to the reference signal, this indicates that the target which produced the reflected signal is approaching towards or receding from the receiver (depending on the sign of the frequency shift) with a speed of ~λΔf (where λ is the wavelength of the radio signal). N.B. the exact speed of approach or recession is dependent on the geometry between the original transmitter, the target, and the receiver (which will generally not be known). In addition, it will be appreciated that if Δf≠0, then Δt will change as the target moves towards or away from the receiver.

One difficulty with passive sensing is the need to search through the surveillance signal in both time and frequency (j and n respectively in equation 1 above) in order to locate any component(s) of the reference signal in the surveillance signal. This can make it rather challenging to perform passive sensing in a real-time, dynamic context.

SUMMARY OF THE INVENTION

The invention is defined in the appended claims.

Some embodiments of the invention provide a method (and/or an associated computer program) for performing passing sensing using wireless digital communications such as WiFi, WiMax or LTE. The wireless digital communications are frame-based with a predefined frame structure. The method includes receiving a reference signal into a reference channel, wherein the reference signal comprises a direct version of a radio frequency transmission as part of said wireless digital communications; receiving a surveillance signal into a surveillance channel; detecting and extracting portions of the reference signal corresponding to data transmissions based on said predefined frame structure; extracting portions of the surveillance signal corresponding to the extracted portions of the reference signal; performing a cross-correlation on the extracted portions of the reference signal and the surveillance signal to determine a range-Doppler surface; and providing a real-time display of said range-Doppler surface and/or of information derived therefrom. This method exploits the (known) predefined frame structure to locate those portions of the wireless digital communications that are most effective for performing passive sensing.

In some embodiments, detecting and extracting portions of the reference signal includes detecting locations of a predefined synchronisation sequence in the reference signal. In many cases, identification of the predefined synchronisation sequence also allows a receiver to determine the particular communications format and its associated frame structure. The receiver can then exploit this knowledge to decode the actual content of the wireless digital communications, for example, to access information such as frame size, etc. In some embodiments, detecting and extracting portions of the reference signal includes the receiver using the detected locations of said predefined synchronisation sequence in the reference signal to determine portions of the reference signal to extract.

In some embodiments, wherein detecting and extracting portions of the reference signal includes splitting the reference signal into multiple successive segments of equal length; identifying portions of the reference signal such that data transmissions are present in the same time interval in each segment with respect to the start of that segment; and extracting the identified portions of the reference signals. Note that portions of the reference signal that do not fall into such intervals are discarded (even if they include data transmissions). This reduces the overall amount of data to be processed to facilitate real-time observations, and also imposes a regular time structure on the extracted portions (which can be exploited by further processing to determine any velocity offset).

Other embodiments of the invention provide an apparatus for performing passive sensing using wireless digital communications. The wireless digital communications are frame-based with a predefined frame structure. The method includes receiving a reference signal into a reference channel, wherein the reference signal comprises a direct version of a radio frequency transmission as part of said wireless digital communications; receiving a surveillance signal into a surveillance channel; detecting and extracting portions of the reference signal corresponding to data transmissions based on said predefined frame structure; extracting portions of the surveillance signal corresponding to the extracted portions of the reference signal; performing a cross-correlation on the extracted portions of the reference signal and the surveillance signal to determine a range-Doppler surface; and providing a real-time display of said range-Doppler surface and/or of information derived therefrom.

Various embodiments of the invention utilise existing signals, such as W-Fi signals (IEEE 802.11) to detect and track moving targets via real-time passive sensing. The passive sensing can function both indoors and outdoors, including in highly cluttered environments, and is able to detect targets through walls. It can also operate in all weather conditions, and light levels. In addition, the ubiquitous nature of wireless communication networks allows the passive sensing to be deployed in a wide range of situations and also for a wide range of surveillance and monitoring applications.

The approach described herein generally allows passive sensing to be performed with respect to signals which have a clearly defined frame structure, such as W-Fi (IEEE 802.11), WiMAX (Worldwide Interoperability for Microwave Access) and (4G) LTE (long-term evolution), and other such systems for mobile telecommunications.

Various embodiments described herein utilise a technique termed burst-specific processing in order to provide high speed signal processing of the received signals, thereby supporting real-time output of the passive sensing results. The burst-specific processing exploits the fact that for many wireless digital communication signals, the data is transmitted according to a known (predefined) structure. In particular, the burst-specific processing disclosed herein, for use in passive radar systems based on such wireless digital communication signals, helps to optimise the data sampling and subsequent cross-correlation processing of such transmissions based on the known structure.

The passive sensing exploits "signals of opportunity", and so does not require a dedicated transmitter section. This results in a receiver-only system which is significantly lower in cost than a comparable active detection system. Furthermore, as the system does not transmit any signals, it is completely covert, and not subject to any spectrum license fees. An additional benefit is that it is does not rely upon obtaining any personal information, such as mobile telephone numbers, which can complicate the exploitation of other data (such as mobile telephone locations and device ID) due to privacy requirements.

Examples of how the passive sensing described herein can be utilised in different application areas include:

*Security: Covert through-wall detection to enable surveillance of areas potentially occupied by terrorists, insurgents or hostage takers. In other more highly concentrated areas, e.g. airports, the passive sensing can be utilised alongside an existing surveillance infrastructure, for example, by slaving to CCTV in order to investigate areas of motion or anomalous behaviour.

*Environmental Monitoring: since WiFi access points are widely deployed in offices, homes and other public indoor and outdoor areas, the passive sensing can be used in transport and retail sectors (for example) to track and map crowd and shopper movements. As noted above, the system is non-cooperative, so that privacy issues do not arise, given that users are not identified and no user data is collected (in contrast to certain other techniques for obtaining shopper movement information, etc).

BRIEF DESCRIPTION OF THE DRAWINGS

Various embodiments of the invention will now be described in detail by way of example only with reference to the following drawings.

DETAILED DESCRIPTION

Figure 1:
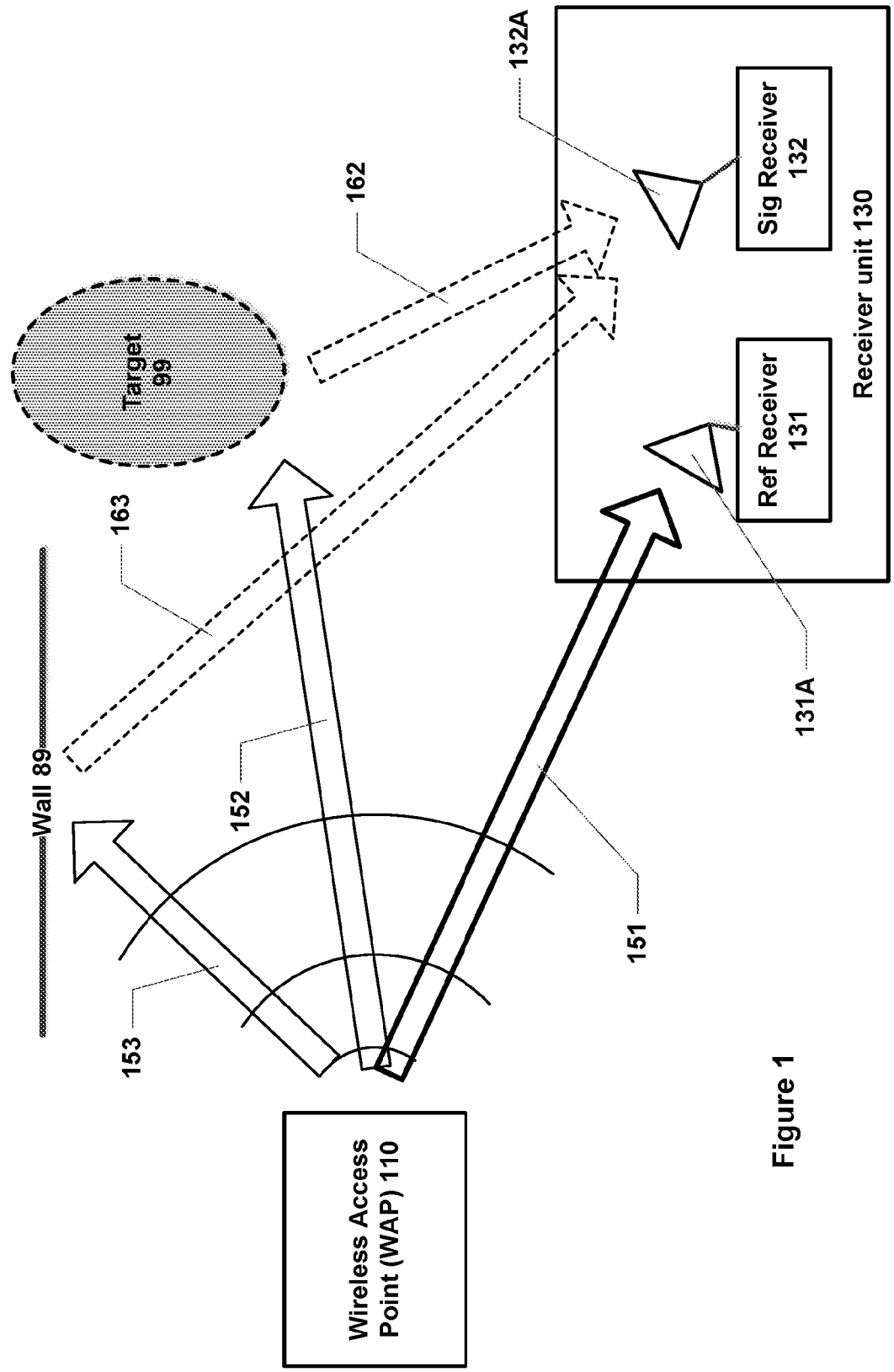
FIG. 1 is a general schematic illustration of passive sensing in accordance with some embodiments of the invention.

FIG. 1 is a general schematic illustration of passive sensing in accordance with some embodiments of the invention. It is assumed that a wireless access point (WAP) 110 exists at a given location. It will be appreciated that such wireless access points are very common, especially in urban settings, often to provide wireless local area network (WLAN) connectivity in accordance with the IEEE 802.11 standard (also referred to as "W-Fi"). As specified in the IEEE 802.11 standard, WAP 110 emits a beacon signal having a predetermined structure and content on a regular basis to allow devices within range to discover and connect to the wireless access point. WAP 110 also transmits and receives signals as part of two-way communications with any device that has connected to the wireless access point. Again, these communications have a predetermined structure (and, in part, content) according to the IEEE 802.11 standard. Note that the wireless access point 110 generally has low directionality in terms of transmissions, i.e. the transmissions are directed over a wide (rather than a narrow) area, since this then allows a mobile device to connect more easily, and avoids the risk of an unintended disconnection as the device is moved from one location to another.

FIG. 1 also illustrates a receiver unit 130 for performing passive sensing. The receiver unit 130 incorporates two receivers. A first receiver in the receiver unit 130 comprises a reference receiver 131, while the second receiver in the receiver unit 130 comprises a signal receiver 132 (also referred to as a surveillance receiver). The reference receiver 131 and the signal receiver 132 are time-synchronised with one another (or enable such time synchronisation to be performed subsequently as part of the data processing), so that a true timing delay can be detected for any signal which is received in both channels.

The reference receiver 131 includes an aerial or antenna 131A which is positioned to obtain a direct transmission 151 from the wireless access point 110. In general this direct transmission 151 can be acquired relatively easily by adjusting the antenna 131A in the direction of the strongest signal, since this will normally correspond to the direct transmission 151 from the wireless access point 110. Typically the antenna 131A of the reference receiver 131 will have a moderately high directionality—but broad enough to ensure that it is not too difficult to locate and acquire the wireless access point 110 (whose position will often not be known in advance).

The antenna 132A of the signal receiver 132 is pointed in a direction of interest to acquire a potential target 99. The antenna 132A of the signal receiver 132 will also generally have a moderately high directionality—corresponding in effect to a field of view for the sensing system. In particular, the directionality is broad enough to provide a reasonable field of view for locating and acquiring a target 99 (whose position will usually not be known in advance), and narrow enough to give reasonable positional (angular) discrimination for the location of the target, and the ability to reject (or at least reduce) noise from other signals.

Thus as shown in FIG. 1, a transmission 152 from the wireless access point 110 propagates towards the target 99 and is then reflected by the target 162 as reflected transmission 162. This reflected transmission 162 may be received by the antenna 132A of the signal receiver 132. Note that the antenna 132A of the signal receiver may also receive other signals, which in effect represent noise. (The antenna 131A of the reference receiver will also likely receive such other signals as noise; however, this is usually less of an issue for the reference receiver 131, since the direct transmission 151 is normally much stronger than a reflected signal transmission 162, thereby providing a much better signal-to-noise ratio).

FIG. 1 illustrates one example of an additional signal which may be received by the signal receiver 132—namely a transmission 153 from the wireless access point 110 which is reflected by (bounces off) a wall 89 or other similar structure, and this reflected transmission 163 is then received by the antenna 132A of the signal receiver 132. The signal receiver 132 may also receive at least some direct transmission 151 from the wireless access point 110 (possibly in a side-lobe of the antenna response).

In many practical situations, especially in city buildings, etc, the radio environment is more complex than shown in FIG. 1. For example, there may be two or more wireless access points 110 that are within range of receiver unit 130 (a common situation when using a laptop receiver is to have multiple Wi-Fi networks available for possible connection). In addition, although FIG. 1 shows just a single wall 89 providing reflections, there may in practice be reflections from other structures such as furniture, wall panels, ceilings, and so on. Furthermore, a signal from WAP 110 might undergo more than one such reflection before arriving at receiver 130. Thus multipath signals, whereby a given receiver receives multiple versions of a given transmission from a given transmitter, each version propagating by a different route, are very common within buildings and cities.

Although FIG. 1 illustrates radio transmission 153 as being reflected from wall 89 (to produced reflected signal 163), in many situations at least a portion of a Wi-Fi transmission will propagate through a wall or similar structure. One consequence of this is that the receiver unit 130 may receive a reflected Wi-Fi signal 162 from target 99 even if the receiver unit 130 is separated from the target 99 by a wall or other dividing structure. This then allows the receiver unit 130 to potentially detect the presence of the target 99 even in situations in which there is no visible (optical) line of sight between the receiver unit 130 and the target 99.

Figure 2:
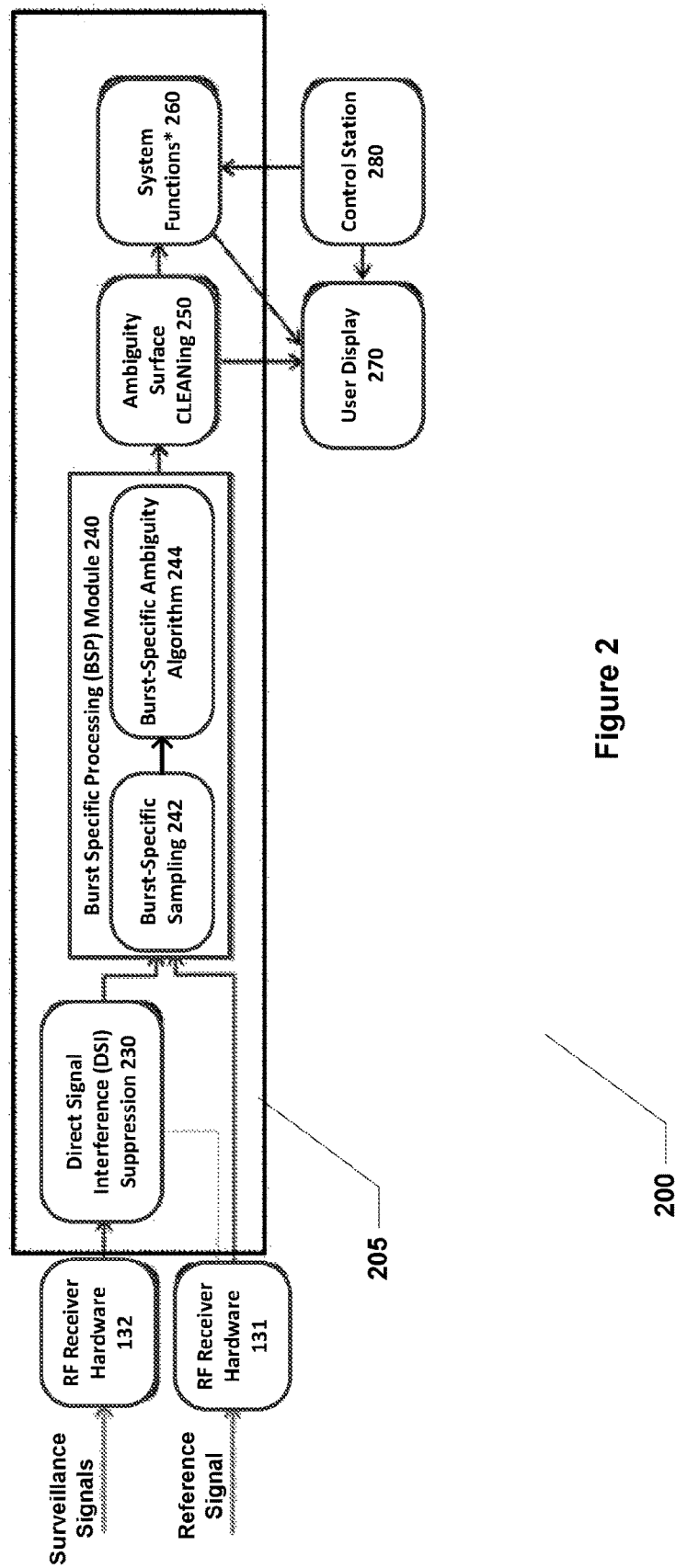
FIG. 2 is a schematic illustration of an apparatus for performing passive sensing in accordance with some embodiments of the invention.

FIG. 2 is a schematic illustration of an apparatus 200 for performing passive sensing in accordance with some embodiments of the invention. In particular, FIG. 2 illustrates a computing unit 205 which processes the signals provided by the reference receiver 131 and by the signal receiver 132. Note that the computing unit 205 and the receiver unit 130 (not specifically shown in FIG. 2) may be integrated into a single passive detection device, or alternatively they may be implemented as two (or more) separate (but interconnected) components within the passive detection system. In addition, the various components or modules shown in computing unit 205 may be implemented as different software components running within one or more computing systems, or as different hardware components, or as some appropriate combination of the two.

In some implementations, the various modules shown in FIG. 2 within computing unit 205 are implemented using software processing on a general purpose computer, such as a laptop. This then allows the processing to be easily reconfigured by changing software parameters or coding as appropriate, without fundamental hardware replacement— for example, to allow the system to work with a different set of communications rather than WI-Fi, such as WiMAX. This also allows the complete system 200 to be assembled into one portable unit, which makes the system well-suited for applications such as counter-terrorism, which require a highly flexible and integrated device. Alternatively, the system may be implemented in a distributed form, which may be more suited to other application scenarios, such as security monitoring at an airport. In such an environment, the receiver unit, incorporating receivers 131, 132 and including the associated antennas, might be mounted remotely from the computing unit 205, with the latter perhaps supporting multiple different receiver units at various locations within the airport, and the computing unit 205 itself being located at a central monitoring service.

The reference signal obtained by the reference receiver 131 may be processed within computing unit 205 to extract, from the signal received by the reference receiver 131, the best version of the reference signal, i.e. the signal as actually transmitted from the wireless access point 110. The quality of the extracted reference signal directly impacts the performance of other components within the computing unit 205 (as described in more detail below). The well-defined nature of the wireless communication signal from wireless access point 110, based on the IEEE 802.11 standard, including a priori knowledge of the synchronization training sequence, frame timing and modulation type, makes it is possible to analyse the distortion of the reference signal as received by the passive detection system. In the case of an orthogonal frequency division modulation for the 802.11 signal, the reference signal reconstruction may a method for recovering the multipath propagated reference signal—i.e. for removing noise or distortion resulting from multipath propagations being received into the reference receiver 131. Analogous techniques may be used for other forms of reference signal.

The surveillance signal from the signal receiver 132 is passed through a module 230 for filtering direct signal interference (DSI), in other words, for filtering out the component of the direct signal 151 (see FIG. 1) as received by the signal receiver 132. The burst specific processing module 240 then takes the reconstructed reference signal and the filtered surveillance signal and derives the cross-ambiguity surface, as defined in Equation 1 above. A technique for deriving this cross-ambiguity surface, termed burst-specific processing, is discussed below with reference to the flowchart of FIG. 9, in accordance with some embodiments of the invention. In general terms the burst specific processing module 240 can be regarded as comprising two stages, each associated with a respective component in the burst-specific processing module 240. The first stage 242 performs burst-specific sampling, which identifies, selects and extracts those portions of the reference signal that are to be used for ambiguity processing, which is then performed by the second stage 244 (in conjunction with the corresponding portions of the surveillance signal(s)).

The output from the burst-specific processing module is the cross-ambiguity surface, which is then subject to ambiguity surface cleaning, as performed by module 250. This ambiguity surface cleaning addresses the fact that the main sources of interference in many application scenarios for passive sensing are direct signal leakage from the illuminator, i.e. WAP 110 in FIG. 1, and strong reflections from stationary objects, such as wall 89 in FIG. 1. On a range-Doppler ambiguity surface, these sources of interference can be represented by a series of scaled and shifted self-ambiguity functions of the reference signal. The expected moving target data may be masked by these strong self-ambiguity artifacts. The ambiguity surface cleaning module 250 therefore employs an iterative method which subtracts the strongest self-ambiguity values in the current iteration to improve the overall signal-to-interference ratio within the range-Doppler surface output from the cross-ambiguity processing. Also, the scale and shift factors are dynamically updated during each iteration. In many situations, it has been found that approximately 10 iterations of this processing are sufficient to mitigate the impact of the direct signal and strong stationary object reflections.

An important aspect of the passive sensing performed herein is to provide a real-time output, which in turn implies rapid signal processing. In particular, the computing system 200 includes or is provided with a display 270 for providing a real-time output to an operator. In some implementations this output may be a representation of the cross-ambiguity surface (as per Equation 1); in other implementations, this cross-ambiguity surface may be processed to determine more physical information, such as the position and movement of a target object in a particular location.

The apparatus 200 further includes a control station, which may be implemented using the input facilities for computing unit 205. This control station allows an operator to adjust and select the operations of the passive sensing apparatus, for example to control output display formats. The apparatus 200 also includes a module 260 within the computing unit 200 for performing various system functions, including tracking, CFAR detection (CFAR is the constant false alarm rate, and in effect can be used to define a threshold for accepting a signal in the presence of noise), and coordinate transformations, such as between range-Doppler axes and a two-dimensional positional (spatial) mapping.

Figure 3:
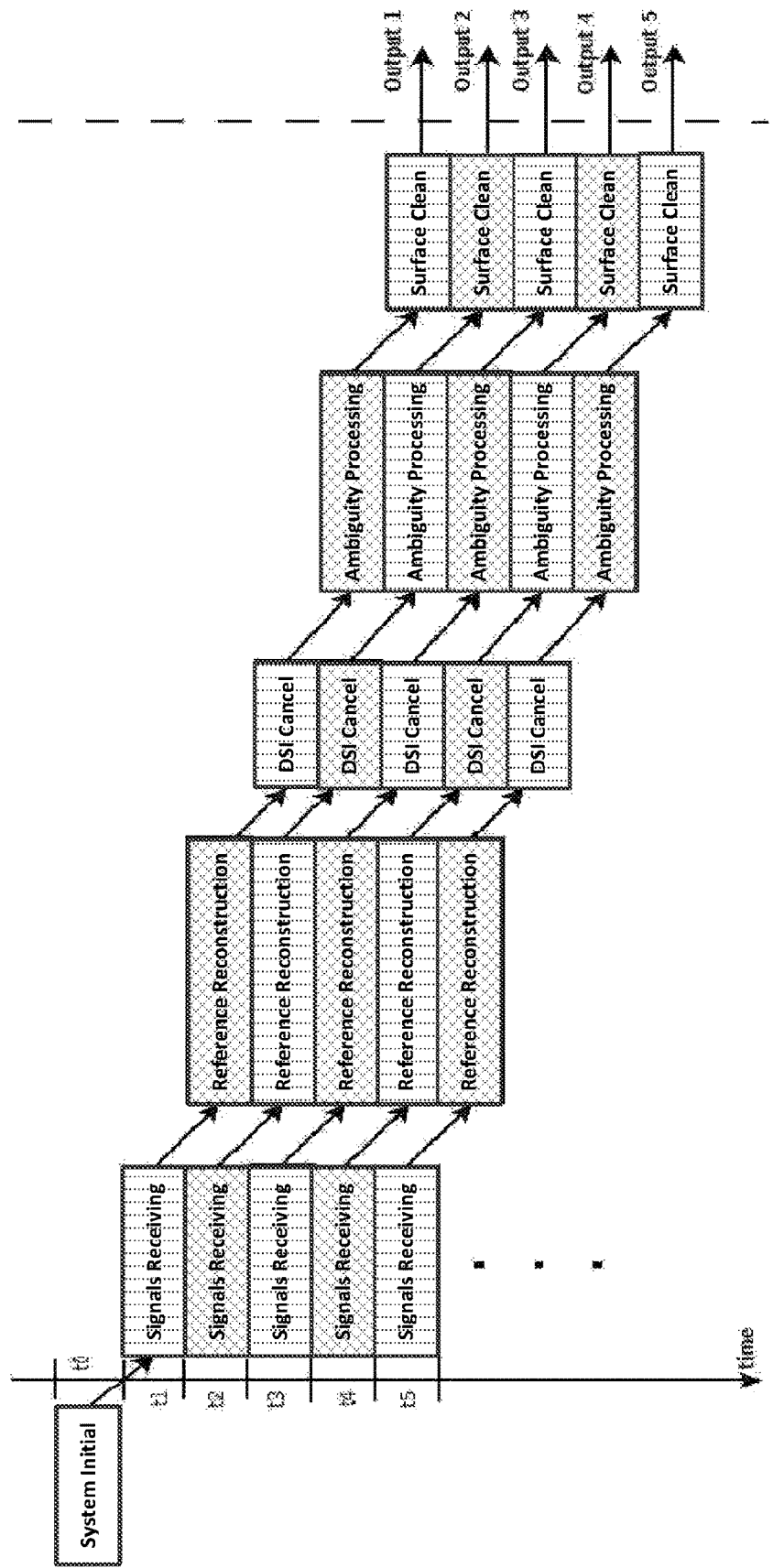
FIG. 3 is a schematic illustration of a pipeline architecture for performing passive sensing processing in accordance with some embodiments of the invention.

One way of helping to achieve the real-time display output is through the use of a pipeline processing flow, such as illustrated in FIG. 3, to maximise the throughput of the system. With this pipelined processing structure, the processing modules of the computing unit 205 shown in FIG. 2 can operate in parallel to help speed up performance.

Figure 4:
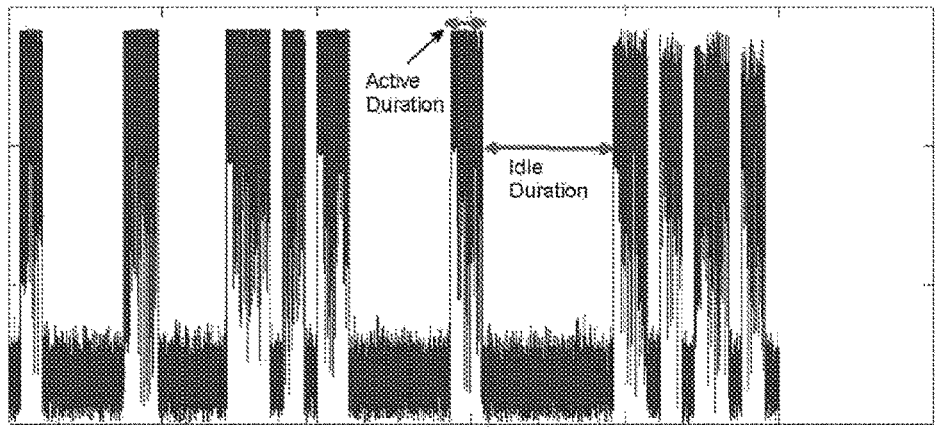
FIG. 4 illustrates in the time domain a typical digital wireless communication signal, for example, from a wireless access point.

A further way of helping to achieve a real-time output is to exploit the properties of a typical communication signal from a wireless access point 110. FIG. 4 illustrates in the time domain an example of a digital wireless communication signal from wireless access point 110, namely a WiFi 802.11 transmission signal. It will be appreciated that this signal is rather heterogeneous, in that it includes some periods of very high communication activity, such as the period marked in FIG. 4 as an 'Active Duration', and other periods of much lower (potentially no) activity, such as the period marked in FIG. 4 as an 'Idle Duration'.

In a conventional implementation of passive sensing, based on equation (1) above, no distinction would be made between idle and active durations in the communications (more particularly, in the transmissions of the radio signals that arrive at the receiver). Thus the sample data in both the surveillance and reference channels would be coherently recorded and then each processed as a continuous and uninterrupted stream. Consequently, a proportion of sampling points which are used in calculations for such passive sensing may represent idle periods, leading to a rather inefficient use of signal processing resources for the passive sensing. In contrast, the passive sensing technique described herein is designed to reflect this bursty nature of the transmission signals such as shown in FIG. 4. In particular, since data samples which are acquired during the idle periods contain little or no useful information for detection purposes (no target-range information), they are removed by the burst-specific processing, with only the more useful (i.e. active) signals (sampled points) being retained. This reduction in the number of sampled points to be processed subsequently facilitates real-time operation of the passive wireless detection system.

The approach described herein also exploits the known structure of a WiFi 802.11 transmission signal (or other wireless digital communication protocol as appropriate) in order to improve the efficiency, and hence reduce the processing time, of the signal processing for the passive sensing. The IEEE 802.11 standard defines a common Medium Access Control (MAC) layer which specifies the communication protocols that govern the operation of wireless local area networks (WLANs) as well as the physical layers that define the transmission of 802.11 frames for data transfer. In particular, due to the evolution of the 802.11x standard, there are different types of physical layer frame. Currently, 802.11 a\b\g\n\ac\ad standards exist and these use seven different physical layer frames: FHSS, IR, DSSS, HR-DSSS, OFDM, HT. Nevertheless, the 802.11 standard includes a Physical Layer Convergence Procedure (PLCP) that prepares frames for transmission by forming a PLCP protocol data unit (PPDU), and all the physical layer frames can be described by the PPDU structure, which consists of a PLCP Preamble, a PLCP Header and a Physical layer Service Data Unit (PSDU). (Note that in a DSSS PHY, see Table A1 below, a PSDU is termed an MPDU, although for present purpose PSDU will be used herein to cover all such data units). The duration and data rate/modulation vary within and between the different physical layer frames, and these differences can be seen in Table A1. As an example, the frame structure of a PPDU may comprise: (i) a physical layer convergence protocol (PLCP) preamble, which is often modulated and sometimes scrambled, and contains an identifier to indicate the data rate and length of the PSDU. The identifiers are defined in the IEEE 802.11x standards and are listed in Table A1 below; (ii) a PLOP header (48 bits) which also uses DBPSK modulation; and (iii) a physical layer service data unit (PSDU) (also referred to as a protocol data unit). The length of the PSDU is determined by the length of a data identifier which is defined in PLOP Header. The duration of the PSDU can be calculated using the formulas listed in Table A1 below, together with the data rate and length of data which are defined in PLOP Header.

More generally, the PLOP Preamble section contains a predefined data sequence for the purpose of synchronisation. The sequence is typically termed "SYNC" in most physical layer frames, or the "Training Sequence" in HT frames. The full set of synchronisation sequences are fully defined in the IEEE Wireless LAN Medium Access Control (MAC) and Physical Layer (PHY) Specifications. In some embodiments, these synchronisation sequences are included in (or downloaded or otherwise available to) the receiver unit 130, more particularly, computing unit 200, to allow the BSP method to exploit a priori knowledge of the sequences in the signal processing.

TABLE A1

PLCP Preamble and Header duration and corresponding modulation

| PHY Frame Type | PLCP Preamble Duration | PLCP Header Duration | PLCP Header Modulation Type | PSDU Duration Calculation (in us) |
| --- | --- | --- | --- | --- |
| FHSS PHY | 96 us | 32 us | 2GFSK (PSF indicates data_rate) (PLX indicates length_data_octets) in octets | 8 * (length_data_octets)/(data_rate) |
| IR PHY | 16 us for 1 Mb/s frame 20 us for 2 Mb/s frame | 41 us for 1 Mb/s frame 25 us for 2 Mb/s frame | L-PPM (DR indicates data_rate) (LENGTH indicates length_data_octets) in octets | 8 * (length_data_octets)/(data_rate) |
| DSSS PHY | 144 us | 48 us | DBPSK + Scrambled (SIGNAL indicates data_rate) (LENGTH indicates length_data_octets) in octets | 8 * (length_data_octets)/(data_rate) |
| HR/DSSS PHY | 144 us for Long PPDU 72 us for Short PPDU | 48 us for Long PPDU 24 us for Short PPDU | PBCC (SIGNAL indicates data_rate) (LENGTH indicates length_data_octets) in octets | 8 * (length_data_octets)/(data_rate) for CCK 8 * (length_data_octets + 1)/(data_rate) for PBCC |

TABLE A1-continued

PLCP Preamble and Header duration and corresponding modulation

| PHY Frame Type | PLCP Preamble Duration | PLCP Header Duration | PLCP Header Modulation Type | PSDU Duration Calculation (in us) |
|---|---|---|---|---|
| ODFM PHY | 16 us for 20 MHz bandwidth 32 us for 10 MHz bandwidth 64 us for 5 MHz bandwidth | 4 us for 20 MHz bandwidth 8 us for 10 MHz bandwidth 16 us for 5 MHz bandwidth | BPSK in a single OFDM symbol (RATE indicates data_rate) (LENGTH indicates length_data_octets) in octets | 8 * (length_data_octets)/(data_rate) |
| HT PHY | | (L-STF) + (L-LTF) 16 us BPSK (L-SIG→data_rate + length_data_octets) for Non-HT and mix mode DBPSK (HT-SIG→data_rate + length_data_octets) for Green field mode and mix mode | | 8 * (length_data_octets)/(data_rate) |

In the time domain, an IEEE 802.11 signal can be considered as a series of continuously cascaded radio frames. The time domain waveform of such an IEEE 802.11 signal shows strong bursty characteristics, and a priori knowledge of the regularity of the frame structure can be exploited for the signal processing for the burst-specific processing. A typical reference and surveillance channel recording of say 100 milliseconds (for example) comprises many bursts (active or available periods), and frames exist within these bursts having the frame structure described above. The BSP method determines the positions and durations of the active periods in the recorded passive radar data for extraction and processing, where an active period is generally considered to be a PSDU, such as described above.

Signal Pre-processing in BSP

Figure 5:
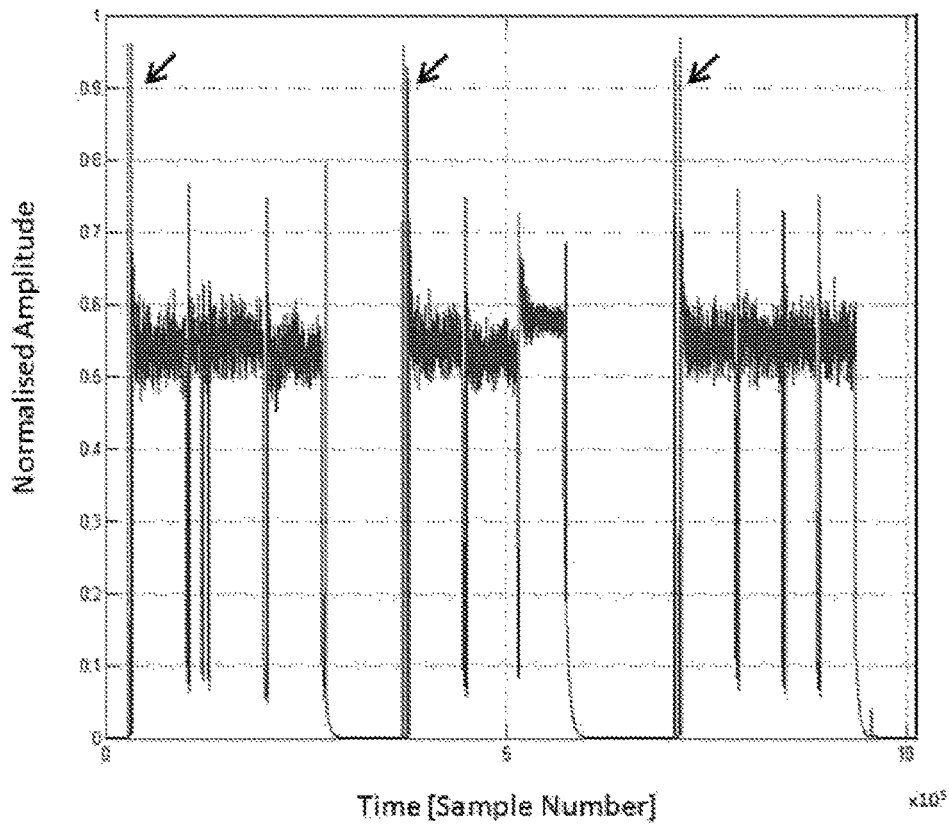
FIG. 5 illustrates a time domain cross-correlation output of a SYNC/training sequence and a recorded passive radar reference channel as produced by a method in accordance with some embodiments of the invention.

In BSP the start and end times of the PSDUs in the recorded passive radar data are first identified. The start time $[T_{d\_Start}]$ of a PSDU corresponds to the start time of the synchronisation sequence and so can be determined by cross correlating the known SYNC or training sequence (as defined in the IEEE standards) with the recorded data according to equation (2):

$$(f*g) = \sum_{m=-\infty}^{\infty} f[m]g[n+m] \quad (2)$$

where f is one of the pre-stored SYNC/training sequences and g is the recorded reference signal. A set of correlation peaks indicating the position of the PPDU start times within an example WiFi radar reference signal recording is illustrated in FIG. 5, which shows time domain output from a cross-correlation between a 802.11 SYNC/training sequence and a recorded passive WiFi reference channel. The correlation peaks indicated in FIG. 5 by the arrows correspond to the start times of the PLCP protocol data units (PPDUs). Finding these correlation peaks also provides an identification of the particular synchronisation sequence present in the signal, since a peak will only appear if the system is using the correct SYNC/training sequence for the correlation. The synchronisation sequence in turn establishes which one of the seven physical layer frame types is being used for data transmission.

The PLOP header section (defined as SIG in an HT physical layer frame) is often modulated with a given scheme containing the bit segments that indicate the data rate and PSDU length of the frame. In these circumstances, the BSP demodulates the PLOP Header in order to determine the data rate and PSDU length. Using this information it is then possible to calculate the duration of the subsequent PSDU data section $\Delta\tau_{psdu}$ (according to Table A1 above) and thus the end time and duration of the PPDU frame. In particular, the start time of the active data segment (the PSDU data section) can be written as:

$$T_{d\_start} = T_{f\_start} + \Delta\tau_{preamble} + \Delta\tau_{header} \quad (3)$$

where $T_{f\_start}$ is the start time of the PPDU frame; $\Delta\tau_{preamble}$ is the duration of the PLCP preamble section; and $\Delta\tau_{header}$ is the duration of the PLCP header section. Note that $\Delta\tau_{preamble}$ and $\Delta\tau_{header}$ are defined in the appropriate IEEE 802.11 standard. The end time of the PSDU is given by equation (4):

$$T_{d\_end} = T_{d\_start} + \Delta\tau_{psdu} \quad (4)$$

Core Signal Processing

Stage 1: Burst Identification

Once the start and end times of all n PSDUs (active data segments) have been identified in the recorded passive WiFi radar reference channel, they are denoted using their positional sample index:

$$[i_1, i_2, i_3, \ldots i_n] \quad (5)$$

where i is the first sample point in the $n^{th}$ PSDU. The end positions of each PSDU are similarly denoted as:

$$[j_1, j_2, j_3, \ldots j_n] \quad (6)$$

where j is the last sample point of the $n^{th}$ PSDU. The jth sample index of any PSDU is calculated from its corresponding ith sample index using equation (4). The length of the nth PSDU (in number of samples) is therefore given as:

$$\Delta l_n = j_n - i_n \quad (7)$$

Stage 2: Segmentation

The overall integration time T defines the raw Doppler resolution of the system $\Delta f$ as:

$$\Delta f = \frac{1}{T} \quad (8)$$

The recorded reference signal is divided into M equal length segments according to equation (9) below:

$$M = \frac{vT}{c} f_0 \quad (9)$$

where v is the maximum expected velocity of the target, c is the velocity of light and $f_0$ is the carrier frequency of the recorded signal (note that M is rounded up to the nearest integer).

Every segment is described using its start and end sample indices as shown in Table A2 below:

TABLE A2

Start and end sample indices for data segments

| Segment (m) | 1 | 2 | 3 | ... | M |
|---|---|---|---|---|---|
| Sample index of Start Position | $Z_1$ | $Z_2 + 1$ | $Z_3 + 1$ | ... | $Z_{m-M} + 1$ |
| Sample index of End Position | $Z_2$ | $Z_3$ | $Z_4$ | ... | $Z_{M+1}$ |

Within each segment, the PSDUs identified in the Burst Identification procedure (described above) can then be referred to using the following notation $[i_{mn}, j_{mn}]$ where $i_{mn}$ refers to the start position of the $n^{th}$ PSDU in the $m^{th}$ segment, and $j_{mn}$ refers to the end position of the $n^{th}$ PSDU in the $m^{th}$ segment.

Figure 6:
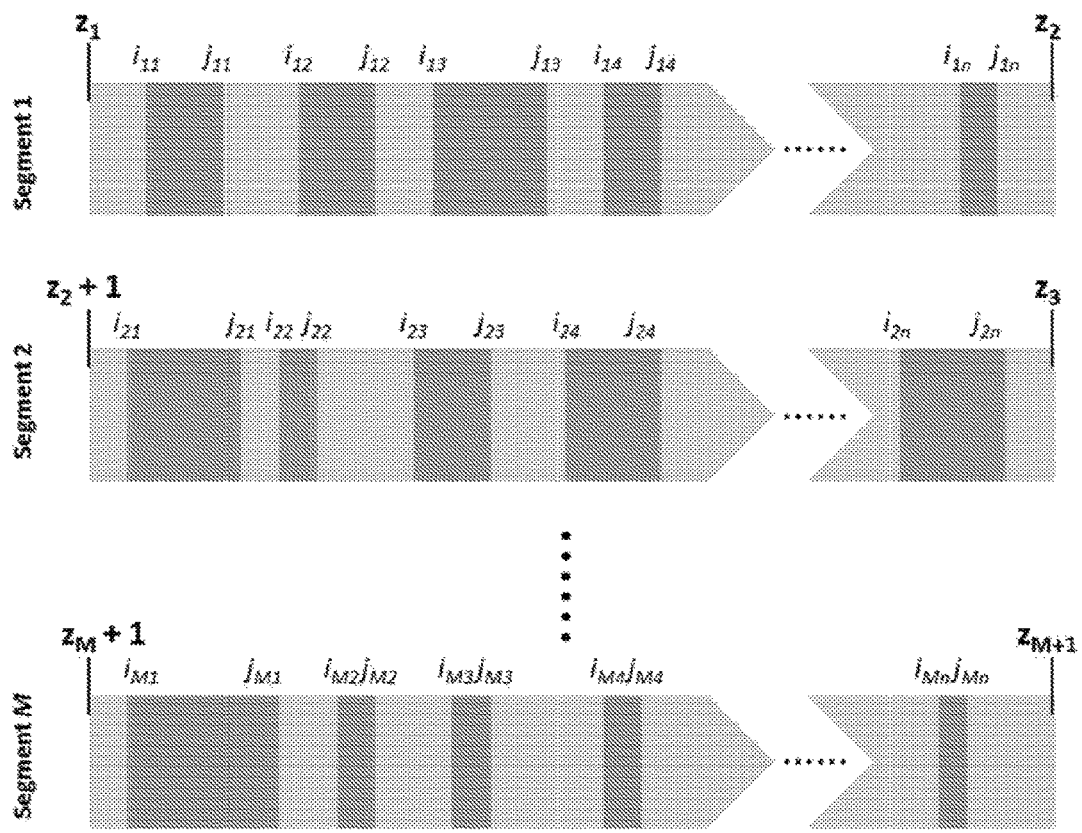
FIG. 6 shows the reconfiguration of a recorded reference signal (part of an IEEE 802.11 standard, W-Fi, signal) into a row-by-row format in accordance with some embodiments of the invention, where the darker boxes indicate active PSDU locations within a given segment.

The next stage is to reorder the segments into a row by row format so that specific PSDU sections eligible for processing can be identified. This is illustrated in FIG. 6 using 'signal blocks', in which each row of FIG. 6 represents a successive segment of the original data. In particular, FIG. 6 shows the reconfiguration of a recorded reference signal into a row-by-row format, where the dark grey boxes indicate active PSDU locations within a given segment. Table A3 presents a computational method which may be used to determine the $[i_{mn}, j_{mn}]$ values of all identified PSDUs after segmentation and reorganization into the row-by-row configurations in accordance with some embodiments of the invention (based on the paired values of i and j from equations 5 and 6 above). The duration $t_{mn}$ of each PSDU (active period) is given by:

$$t_{mn} = j_{mn} - i_{mn} \quad (10)$$

TABLE A3

Method for determining the $[i_{mn}, j_{mn}]$ values of all identified PSDU's after segmentation and reorganisation into the row-by-row configurations.

```
i_mid = i_1
j_mid = j_1
for COUNT = 1:M
    a = 1
    b = 1
    While i_mid > z_i && i_mid < z_{i+1}
        If j_mid < z_{i+1}
            [i_ia, j_ia] = [i_mid, j_mid]
            i_mid = i_b
            j_mid = j_b
        elseif j_mid ≥ z_i
            [i_ia, j_ia] = [i_mid, z_i]
            i_mid = z_{i+1}
            j_mid = j_mid
        end if
        a + +
        b + +
    end while
    i_ia = i_ia - z_i
End
```

Stage 3: Selective Sampling

In the selective sampling stage, sub-sections of the PSDUs which are eligible for cross-correlation processing are identified, where eligible sub-sections are considered to be those sub-sections for which the active period for all M segments in the row-by-row configuration overlap. Note that each segment has a duration T/M, so that an overlap between two eligible subsections in first and second rows respectively occurs when the two eligible subsections are separated by a time period of approximately (n+1)T/M, where n is the number of intervening rows between the first and second rows (i.e. n=0 for adjacent rows, where the second row immediately follows the first row in the original data set).

In addition, the sub-sections are selected such that the overlapping regions exceed a threshold for the minimum duration ($\tau_{min}$). In some embodiments, this threshold has been determined as a minimum of approximately 4 microseconds; however, other embodiments may have a higher value for this threshold, dependent upon various properties such as overall integration time, signal-to-noise ratio, maximum velocity of interest, and so on. As described below, $\tau_{min}$ is generally significantly greater than the maximum expected delay time for detecting a signal in the reference channel.

Figure 7:
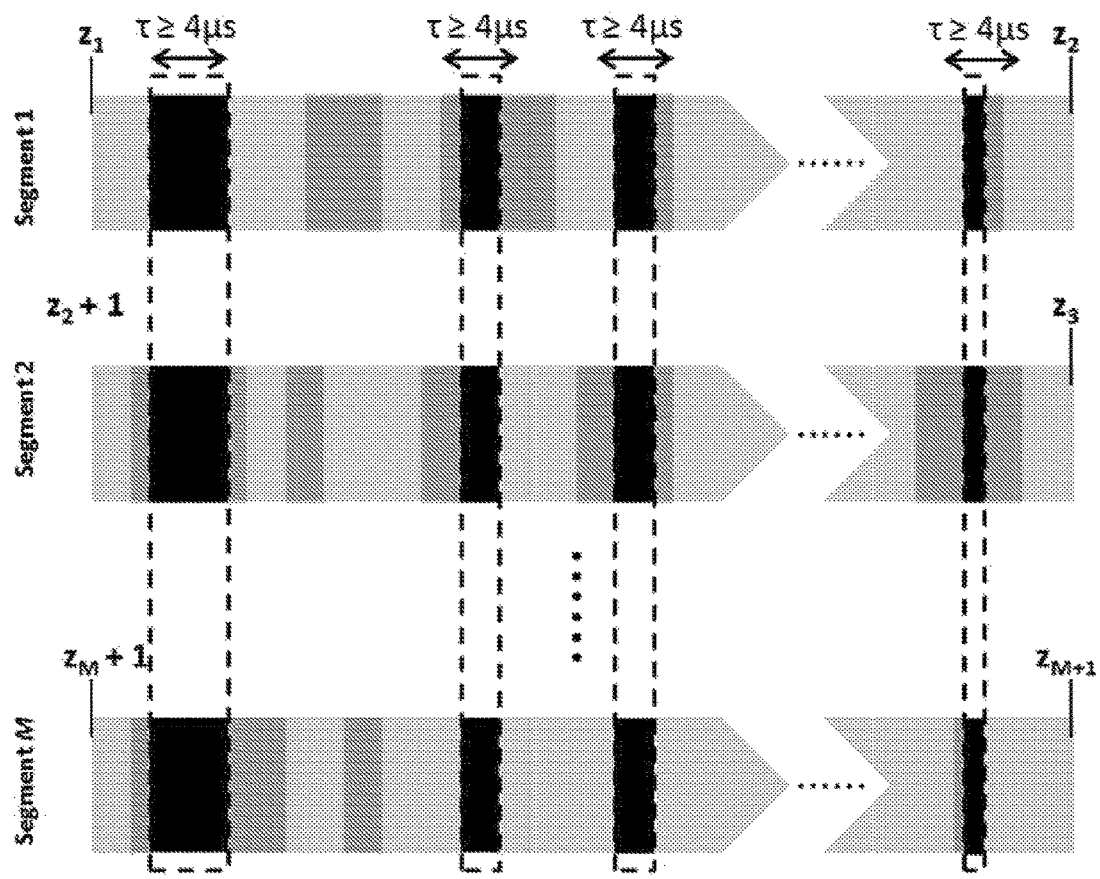
FIG. 7 illustrates in schematic form how portions of the segmented signal of FIG. 6 are extracted for further processing in accordance with some embodiments of the invention.

The procedure for identifying eligible sub-sections is illustrated in FIG. 7, which depicts those PSDU subsections from FIG. 6 that are found to overlap across all segments for more than the minimum threshold period and therefore are selected for further processing (these selected sub-sections are shown as black in FIG. 7). Each selected region (namely a vertical black stripe across all rows in FIG. 7) can be defined by a start time $T_1$ and an end time $T_2$, where $T_1$ and $T_2$ are the same for each segment and are measured with respect to the start of the segment (1 to M), subject to the following conditions: $0 \leq T_1 < T_2 \leq T/M$ and $T_2 - T_1 \geq \tau_{min}$ (plus the time interval between $T_1$ and $T_2$ corresponding to an active segment).

It should be noted that a threshold of $\tau_{min}=4$ μs for the minimum duration of the overlapping sub-sections, such as described above, is very short compared to passive radar integration times, which are typically of the order of many 100 s of milliseconds. This, coupled with the fact that WiFi transmissions are of usually of a high duty cycle (so fewer idle periods), implies that there are rarely situations for which there are no eligible sub-sections available for processing. Nevertheless, if this is found to be the case, the current set of synchronously recorded reference and surveillance data may be discarded, and the BSP processing can then be applied to the next set of recorded data.

Stage 4: Cross Referencing with the Surveillance Channel

The processing so far has been performed on the reference channel signal to determine those positions of the reference channel signal that are particularly suitable for use in passive sensing. The next step is to identify the corresponding portions of the surveillance signal, i.e. to cross-reference the positions of the PSDU subsections identified as eligible for processing to corresponding positions of the synchronously recorded surveillance channel. Note that a buffer zone of duration $x_{buffer}$ is also included here to account for any delay associated with the time-of-flight difference between transmission and reception of the reflected target signal. In other words, if the selected region of the reference channel is defined by $T_{d\_start}$ and $T_{d\_end}$ (see equations (3) and (4) above), then the start and end times of the corresponding selected region of the surveillance channel are defined respectively by $T_{d\_start}$ and $T_{d\_end} + x_{buffer}$. The value of $x_{buffer}$ may be based on the maximum plausible or desired range (path difference) for detecting a surveillance signal-typically of the order of tens of meters.

Figure 8:
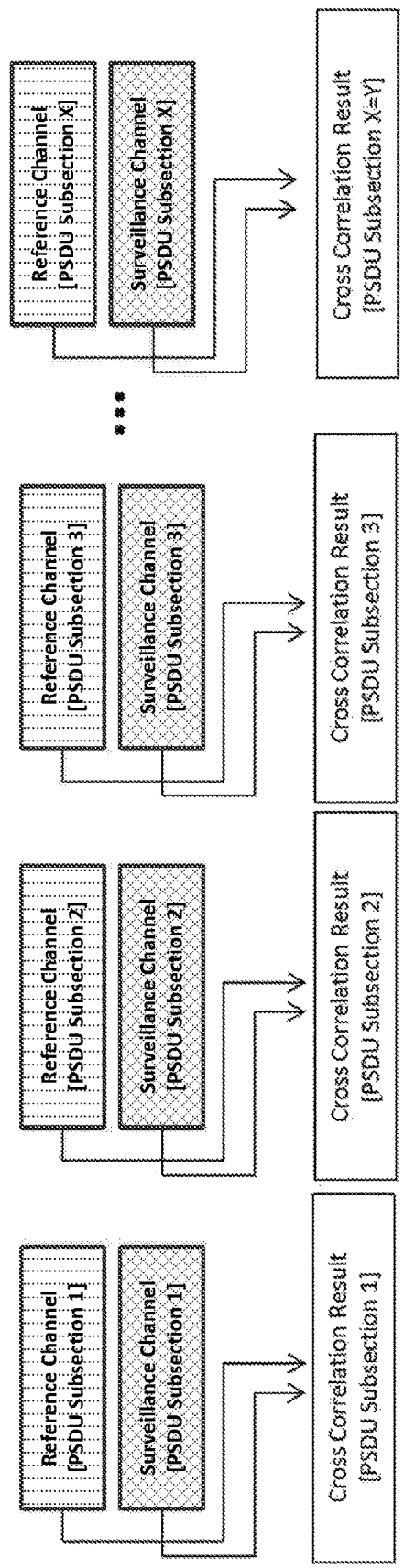
FIG. 8 illustrates in schematic form the ambiguity processing performed on the extracted portions from FIG. 7 in accordance with some embodiments of the invention.

The corresponding PSDU subsection pairs from both the reference and surveillance channels are now cross-correlated as shown in FIG. 8. In particular, if we identify $N_p$ eligible PSDU subsections in each row of FIG. 7, i.e. each row in FIG. 7 has $N_p$ regions which are longer than the threshold time $\tau_{min}$ (these are shaded black), then one of these regions is selected (e.g. at random, or the longest), so that the total number of cross-correlations to be performed is M (the same region is selected from each row or subset).

Stage 5: Generation of the Cross-Ambiguity Surface Using Bursty Signal Content

The resultant cross-correlation outputs from FIG. 8 are ordered according to the following matrix:

$$\begin{bmatrix} p_{1,1} & p_{1,2} & \cdots & p_{1,v} \\ p_{2,1} & p_{2,2} & \cdots & p_{2,v} \\ \vdots & \vdots & \ddots & \vdots \\ p_{n,1} & p_{n,2} & \cdots & p_{n,v} \end{bmatrix}$$

where $P_{a,b}$ is the $b^{th}$ sample in the $a^{th}$ correlation output with v total sampling points.

Conceptually, each row of the above cross-correlation matrix corresponds to one of the PSDU subsections, hence the number of rows (n) in the matrix is given by n=M×$N_p$. Note that as we move along any individual row, the delay between the reference channel and the surveillance channel increases, which therefore corresponds to a greater distance (due to the delay caused by the longer path length for the signal). In other words, the cross-correlations are determined for v different timing delays. The minimum delay for the cross-correlation (i.e. a=1) generally corresponds to the sampling period of the (demodulated) wireless communication signal. If this is (for example) approximately 100 MHz, then the shortest delay that can be detected is approximately 10 ns, which corresponds to a range of 3 m (this is the additional path length of the surveillance channel via the target compared to the direct path length of the reference channel, as opposed to just the distance from the receiver to the target). In general, the maximum correlation delay (i.e. a=v) may be set equal to $x_{buffer}$, again based on the maximum plausible (or desired) range for detecting a surveillance signal. Note that $\tau_{min}$=4 µs corresponds to a range or path length of 1.2 km, which is much larger than this plausible range (tens of meters) for detecting a surveillance signal. Accordingly, even active regions which only have the minimum duration of 4 µs still allow a full set of cross-correlation values (delays) to be determined.

In contrast, a column of the above matrix represents signal behaviour at the same time delay (i.e. same target range), but for increasingly later points in time. In particular, the first $N_p$ values in a column correspond to the cross-correlation from the first segment or row, the next $N_p$ values in a column correspond to the cross-correlation from the second segment or row, and so on. This means that there is a timing periodicity in the columns, since if a first value occurs $N_p$ rows below a second value in a column, these are part of the same vertically aligned set of PSDU segments such as shown in FIG. 7, and are therefore separated in time by T/M.

The columns of the matrix can be turned into a frequency offset or velocity to produce the cross ambiguity (Doppler-range) surface by taking the Fourier Transform of each column in the matrix. This is because if the surveillance channel contains a version of the reference channel which is slightly offset in frequency (i.e. Doppler shifted), then the surveillance channel will go successively in-phase and out-of-phase with the reference channel, thereby leading to a periodic variation in the correlation function with time. The Fourier transform converts this periodic variation into a frequency signal having a peak corresponding to the periodic variation, where the peak indicates the frequency offset (proportional to relative velocity) between the surveillance and reference channels. Accordingly, performing a Fourier Transform on each column of the matrix specified above generates the cross ambiguity surface.

In general, the greatest frequency offset that can be detected corresponds approximately to a period of variation corresponding to 2×$N_p$ rows of the matrix (i.e. a period corresponding to a spacing of two rows down through the M segments of FIG. 7). Conversely, the smallest frequency offset that can be detected corresponds approximately to a period of variation corresponding to (M−1)×$N_p$ rows of the matrix, I.e. a period corresponding to a spacing of from the top row of the M segments of FIG. 7 down to the bottom row. These minimum/maximum frequency offsets can be approximated by (1/T) and (M/2T) respectively. For an integration time of 1 second, the minimum frequency offset is therefore 1 Hz, which for a signal of 3 GHz implies a velocity resolution of about 0.1 m/s. Note that any measured velocity is in a direction towards or away from the receiver unit 130 (i.e. transverse velocity does not produce any frequency offset).

Having a larger integration time produces a more detailed velocity resolution, however it also causes a corresponding increase in the time delay (lag) of the processed signal as the system waits to acquire the complete signal, A further contribution to the time delay is that a longer integration time produces more data to process, hence there may be additional processing delays. Accordingly, in a real-time system such as shown in FIG. 2, the integration time must be determined based on the trade-off between improving velocity resolution and reducing time lag, and will usually be no more than a couple of seconds at most. Nevertheless, there are various ways to ameliorate this trade-off. For example, the system might operate with two (or more) different integration times, thereby producing some data with a high velocity resolution (from the longer integration time) and producing other data with a low time lag (from the smaller integration time). A further possibility it is calculate overlapping time integrations—e.g. to have a time integration period of say 1 second, but to start a new integration period every 0.5 seconds. Although this does not reduce the time lag of the resulting data, it does enhance its refresh rate.

The maximum frequency offset is then M/2 greater than the minimum detectable frequency offset. Accordingly, M can be selected based on the integration time and the likely maximum target velocity for detection, as per equation (9) above. In some implementations, M is typically in the range 50-200, e.g. 80 or 100, the latter giving a maximum detectable velocity of 10 m/s (for an integration time of 1 s). Note that if higher velocities are present, then they will appear at a lower frequency alias.

Figure 9:
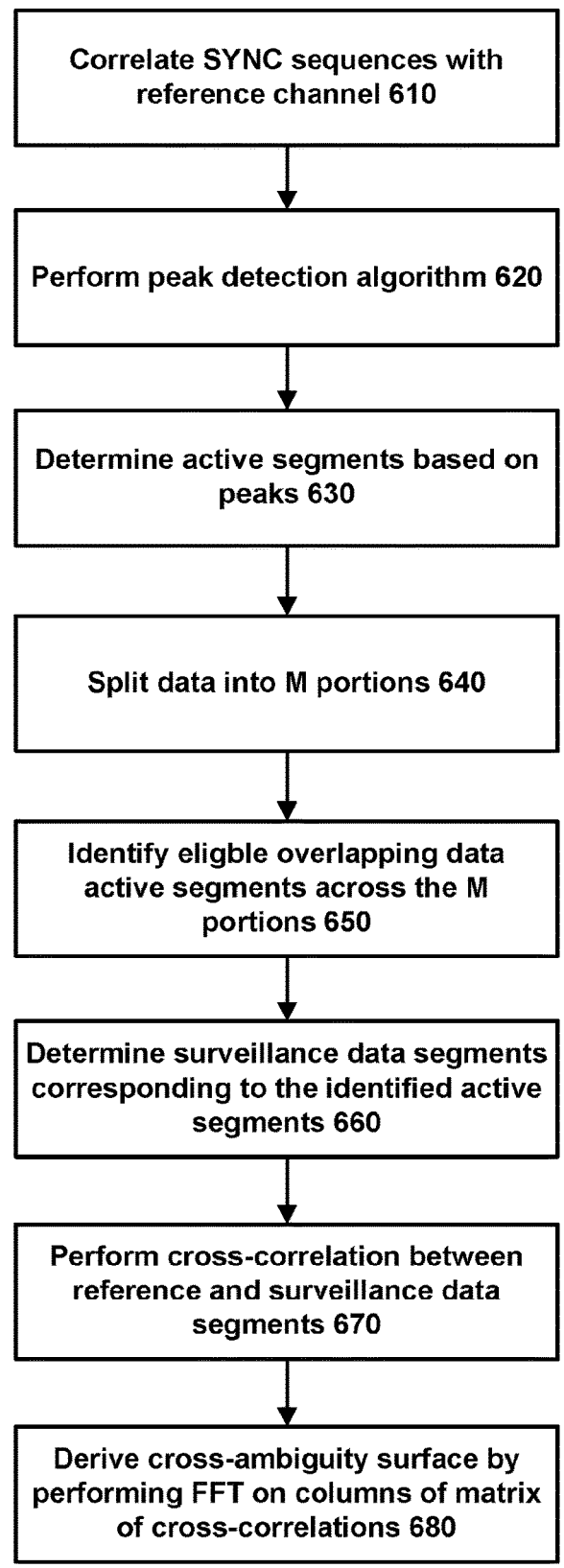
FIG. 9 is a flow-chart illustrating the use of burst-specific processing to derive a cross-ambiguity surface in accordance with some embodiments of the invention.

FIG. 9 is a flowchart of a method for performing the burst-specific processing in accordance with some embodiments of the invention. The method includes correlating the reference channel signal with the known SYNC/training sequence (operation 610). A peak detection algorithm is then used to locate any peaks in the resulting correlation (operation 620), where a peak indicates the presence of a SYNC/training sequence in the reference channel signal (as illustrated in FIG. 5. Once the positions of all the SYNC/training sequences have been identified in a reference channel recording having a duration of T seconds, knowledge about the makeup of the frame structure can be exploited to determine the active (signal) locations in the reference channel data (operation 630). The recorded reference channel data is now divided into M equal size portions (operation 640), as per FIG. 6, and eligible active data portions are identified based on their overlapping presence in all data segments (operation 650), as per FIG. 7.

The next step is to cross-reference the positions of the active data regions identified in the reference channel with corresponding positions in the recorded surveillance channel (operation 660), thereby allowing the relevant data to be identified and extracted from the surveillance channel. A buffer zone is included at the end of the cross-referenced positions in order to account for any delay associated with the additional time-of-flight for the surveillance signal compared with the reference channel signal.

The selected data segments for the reference channel and the surveillance channel are extracted and ambiguity processing is performed, including determining a cross-correlation between corresponding segments (670). This produces a matrix output, where each row of the matrix represents the correlation output (for different delays) of a given data segment. The cross-ambiguity surface can then be obtained by performing a (fast) Fourier transform on each column of this matrix (operation 680).

The burst-specific processing such as shown in FIG. 9 may discard data samples acquired during idle periods in digital communication transmissions, since these contain little or no information of relevance to passive sensing. This helps to reduce the amount of data to be processed and therefore assists in the real-time presentation of the data. In addition, the burst-specific processing exploits the known structure of the data by demodulating the wireless signal to access the signal content (rather than just treating the received transmissions as an abstract signal of unknown structure). For example, a synchronisation signal is detected which in turn allows the signal to be decoded and the location of particular data units to be determined precisely (without further analysis of the signal properties). These data units generally represent the highest bandwidth data communications, and hence provide the best positioning information for the passive sensing. Other portions of the signal which are less suited for use in passive sensing (such as beacon signals) can be discarded.

The processing of FIG. 9 performs the segmentation of FIG. 6 followed by the identification of aligned active regions of data across all the segments, as shown in FIG. 7. The cross-correlation is then performed with respect to an aligned set of active regions (in some embodiments, results for multiple such aligned sets of active regions might be added together to improve signal to noise). Note that by enforcing the alignment across the various segments, a periodic structure is derived which facilitates rapid identification of frequency offsets. Also, by limiting the cross-correlation calculations to individual active regions, the overall amount of data to be processed is reduced, likewise the scope of any given cross-correlation calculation (compared to the general approach of equation (1), which defines a search across the entire data set). Accordingly, performing the burst-specific processing as described herein has been found to allow the signal processing for the passive sensing to be performed in real-time, and hence the cross-ambiguity surface itself to be displayed to a user or operator in real-time. For example, it has been found that using this approach can achieve up to a 90% reduction in the number of samples to be processed, compared with more conventional approaches, while still achieving good sensitivity. This significant reduction in the data-processing overhead, as enabled by the burst-specific processing, not only supports real-time operation of the passive wireless detection system, but it also generally allows the passive wireless detection system to be formed of simpler components. This helps to reduce the costs and power consumption of the resulting system, and in some cases the weight as well. Note that lower power consumption and weight are attractive properties for portable devices that may be required in certain application contexts.

It has been found that the passive detection system described herein tends to be most useful for discriminating movement (and moving items). Thus in most indoor environments, there tends to be a lot of clutter at zero velocity offset due to various multipath effects. There are various ways to improve the zero velocity information. For example, the passive sensing system may model the room environment at a time of little or no movement, e.g. late at night, to derive a form of background signal. The presence of a new (stationary) item could then be detected as a deviation from this background signal. The background signal might also be modelled instead of (or as well as) being measured, for example, based on architectural plans, etc.

It may also be desirable to enhance the positional (location) information that can be derived from the passive sensing system. This is defined in the transverse direction by the antenna beamwidth of the surveillance channel, which may be relatively broad, and in the radial direction by the effective sampling rate (as described above). One way to enhance the positional information is to have multiple surveillance antennas pointing in different directions, each with a relatively narrow beamwidth. Another possibility is to combine results from two or more passive sensing systems (each having a reference channel and one or more surveillance channels), where the two or more passive sensing systems have different locations. The results from such multiple passive sensing systems can be combined via a process such as triangulation to give a more precise estimate for location. In addition, having multiple passive sensing systems can give velocity information in two dimensions (or possibly three dimensions), since a transverse velocity with respect to one passive sensing system will generally have a radial component with respect to the other passive sensing system(s).

The above embodiments involving various data (signal) processing may be performed by specialised hardware, by general purpose hardware running appropriate computer code, or by some combination of the two. For example, the general purpose hardware may comprise a personal computer, a computer workstation, etc. The computer code may comprise computer program instructions that are executed by one or more processors to perform the desired operations. The one or more processors may be located in or integrated into special purpose apparatus, such as a dedicated passive sensing system. The one or more processors may comprise digital signal processors, graphics processing units, central processing units, or any other suitable device. The computer program code is generally stored in a non-transitory medium such as an optical disk, flash memory (ROM), or hard drive, and then loaded into random access memory (RAM) prior to access by the one or more processors for execution.

In conclusion, the skilled person will be aware of various modifications that can be made to the above embodiments to reflect the particular circumstances of any given implementation. Moreover, the skilled person will be aware that features from different embodiments can be combined as appropriate in any given implementation. Accordingly, the scope of the present invention is defined by the appended claims and their equivalents.

The invention claimed is:

1. A method of performing passive sensing using wireless digital communications, wherein said wireless digital communications are frame-based with a predefined frame structure, and wherein said wireless digital communications are Wi-Fi communications from a wireless access point or WiMAX or LTE communications, said method comprising:
   receiving a reference signal into a reference channel, wherein said reference signal comprises a direct version of a radio frequency transmission as part of said wireless digital communications;
   receiving a surveillance signal into a surveillance channel;
   detecting and extracting portions of the reference signal corresponding to data transmissions based on said predefined frame structure;
   extracting portions of the surveillance signal corresponding to the extracted portions of the reference signal;
   performing a cross-correlation on the extracted portions of the reference signal and the surveillance signal to determine a range-Doppler surface;
   and providing a real-time display of said range-Doppler surface and/or of information derived therefrom;
   wherein the wireless digital communications comprise durations of active burst interspersed in the time domain with durations of idle bursts, and said method further comprises identifying and discarding from the reference signal the durations of the idle bursts prior to detecting and extracting portions of the reference signal corresponding to data transmissions based on said predefined frame structure.

2. The method of claim 1, wherein detecting and extracting portions of the reference signal includes detecting locations of a predefined synchronization sequence in the reference signal.

3. The method of claim 2, wherein detecting and extracting portions of the reference signal includes using the detected locations of said predefined synchronization sequence in the reference signal to determine portions of the reference signal to extract.

4. The method of claim 1, wherein said data transmissions comprise physical layer service data units (PSDUs).

5. The method of claim 1, wherein detecting and extracting portions of the reference signal includes:
   splitting the reference signal into multiple successive segments of equal length;
   identifying portions of the reference signal such that data transmissions are present in the same time interval in each segment with respect to the start of that segment; and
   extracting the identified portions of the reference signals.

6. The method of claim 5, further comprising setting a minimum duration for said time interval.

7. The method of claim 1, wherein extracting portions of the surveillance signal corresponding to the extracted portions of the reference signal includes identifying portions of the surveillance signal with matching timings to the extracted portions of the reference channel, plus allowing for a predefined maximum time delay between the reference signal and the surveillance signal.

8. The method claim 1, wherein performing a cross-correlation on the extracted portions of the reference signal and the surveillance signal to determine a range-Doppler surface comprises:

a) performing a cross-correlation between each extracted portion of the reference signal and its corresponding extracted portion of the surveillance signal to obtain an n by v matrix, wherein n represents the number of extracted portions from the reference signal, and v represents the number of timing delays calculated per cross-correlation, to produce the matrix:

$$\begin{bmatrix} p_{1,1} & p_{1,2} & \cdots & p_{1,v} \\ p_{2,1} & p_{2,2} & \cdots & p_{2,v} \\ \cdots & \cdots & \cdots & \cdots \\ p_{n,1} & p_{n,2} & \cdots & p_{n,v} \end{bmatrix}$$

where $P_{a,b}$ is the bth sample in the ath correlation with a total of v sampling points; and b) performing an Fourier transform operation on each column of the this matrix to obtain the range-Doppler surface.

9. A method comprising providing multiple receiver units positioned at different locations, each receiver unit receiving a reference signal into a reference channel and a surveillance signal into a surveillance channel, wherein said reference signal comprises a direct version of a radio frequency transmission as part of Wi-Fi communications from a wireless access point or WiMAX or LTE communications, the method comprising:
   for each receiver unit, determining a range-Doppler surface in accordance with the method of any preceding claim; and
   combining information from the multiple range-Doppler surfaces from the respective multiple receiver units to provide an enhanced estimate of position and/or velocity.

10. A non-transitory computer-readable storage medium storing instructions that when executed by a computer cause the computer to perform a method for passive sensing using wireless digital communications, wherein said wireless digital communications are frame-based with a predefined frame structure, and wherein said wireless digital communications are Wi-Fi communications from a wireless access point or WiMAX or LTE communications, said method comprising:
   receiving a reference signal into a reference channel, wherein said reference signal comprises a direct version of a radio frequency transmission as part of said wireless digital communications;
   receiving a surveillance signal into a surveillance channel;
   detecting and extracting portions of the reference signal corresponding to data transmissions based on said predefined frame structure;
   extracting portions of the surveillance signal corresponding to the extracted portions of the reference signal;
   performing a cross-correlation on the extracted portions of the reference signal and the surveillance signal to determine a range-Doppler surface;
   and providing a real-time display of said range-Doppler surface and/or of information derived therefrom;
   wherein the wireless digital communications comprise durations of active burst interspersed in the time domain with durations of idle bursts, and said method further comprises identifying and discarding from the reference signal the durations of the idle bursts prior to detecting and extracting portions of the reference signal corresponding to data transmissions based on said predefined frame structure.

11. A system for passive sensing using wireless digital communications, wherein said wireless digital communications are frame-based with a predefined frame structure, and wherein said wireless digital communications are Wi-Fi communications from a wireless access point or WiMAX or LTE communications, said system comprising a circuit that:
- receives a reference signal into a reference channel, wherein said reference signal comprises a direct version of a radio frequency transmission as part of said wireless digital communications;
- receives a surveillance signal into a surveillance channel;
- detecting and extracting portions of the reference signal corresponding to data transmissions based on said predefined frame structure;
- extracts portions of the surveillance signal corresponding to the extracted portions of the reference signal;
- performs a cross-correlation on the extracted portions of the reference signal and the surveillance signal to determine a range-Doppler surface;
- and providing a real-time display of said range-Doppler surface and/or of information derived therefrom;
- wherein the wireless digital communications comprise durations of active burst interspersed in the time domain with durations of idle bursts, and said circuit further identifies and discards from the reference signal the durations of the idle bursts prior to detecting and extracting portions of the reference signal corresponding to data transmissions based on said predefined frame structure.

\* \* \* \* \*

UNITED STATES PATENT AND TRADEMARK OFFICE
CERTIFICATE OF CORRECTION

PATENT NO. : 10,288,725 B2
APPLICATION NO. : 15/032592
DATED : May 14, 2019
INVENTOR(S) : Tan et al.

Page 1 of 1

It is certified that error appears in the above-identified patent and that said Letters Patent is hereby corrected as shown below:

On the Title Page

In ABSTRACT (Item (57), Line 5), please delete the word, "to".

Signed and Sealed this
Ninth Day of July, 2019

Andrei Iancu
*Director of the United States Patent and Trademark Office*